Figure 1:
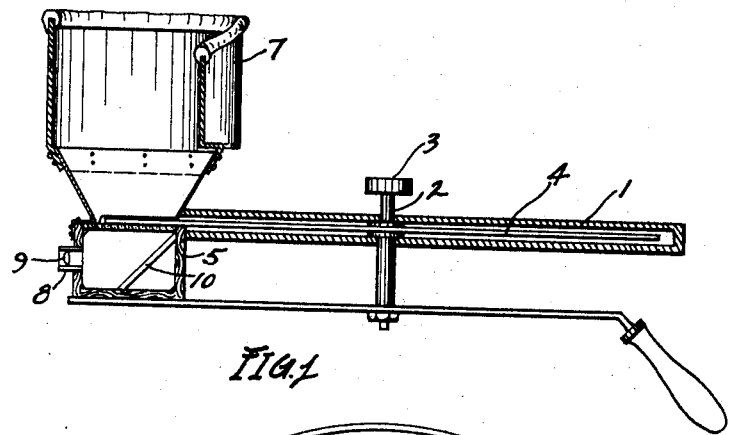

F. M. WADSWORTH.
TOOTH FORM FINDER.
APPLICATION FILED APR. 17, 1919.

1,389,022.

Patented Aug. 30, 1921.

INVENTOR
FRANK M WADSWORTH
BY Whiteley & Ruckman
ATTORNEYS.

UNITED STATES PATENT OFFICE.

FRANK M. WADSWORTH, OF MINNEAPOLIS, MINNESOTA.

TOOTH-FORM FINDER.

1,389,022.  Specification of Letters Patent.  Patented Aug. 30, 1921.

Application filed April 17, 1919. Serial No. 290,802.

*To all whom it may concern:*

Be it known that I, FRANK M. WADSWORTH, a citizen of the United States, and a resident of Minneapolis, in the county of Hennepin and State of Minnesota, have invented certain new and useful Improvements in Tooth-Form Finders, of which the following is a specification.

One object of my invention is to provide a device for comparing the shape of a person's face with various representations of teeth.

Another object of my invention is to provide in a device of the class described a movable member having thereon representations of various types of teeth and means for viewing the reduced outline of a person's face through one of the tooth representations on the member.

With these and incidental objects in view, the invention consists of certain novel features of construction and combination of parts, the essential elements of which are hereinafter described with reference to the drawing which accompanies and forms a part of this specification.

Figure 2:
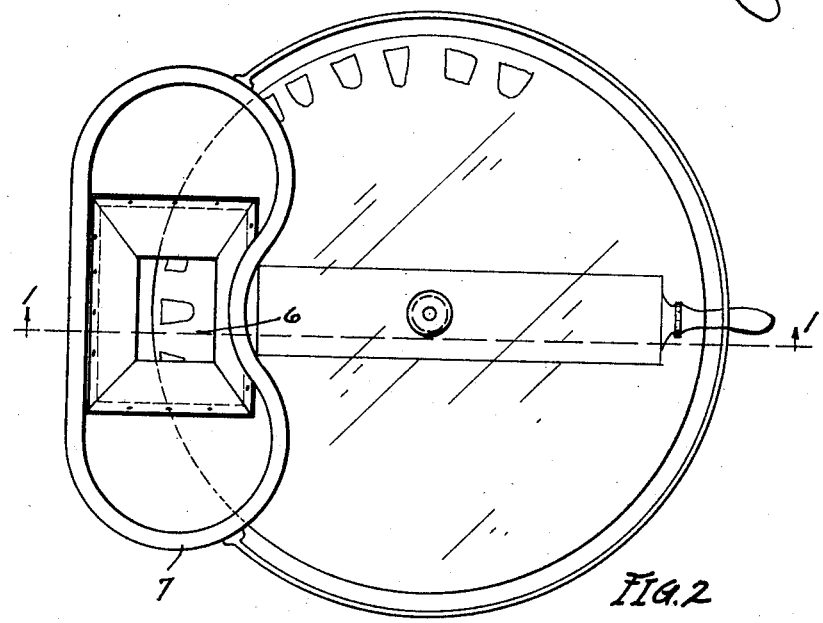

In the drawing Figure 1 is a section taken on the line 1—1 Fig. 2, and Fig. 2 is a plan view of my improved tooth form finder.

As shown in the drawings, the housing 1 has journaled therein a shaft 2 rotatable by a button 3 and this shaft has clamped thereto a transparent disk 4 so the disk may be rotated by turning the button 3.

Carried by the housing 1 is a box 5 over which a portion 6 of the disk will travel as it is rotated, and extending upwardly from the box and housing is an eye-piece 7.

Projecting outwardly from the box 5 is a lensholder 8 having a reducing lens 9 therein, and the mirror 10 is positioned in the box so that light rays directed upon the mirror by the lens 9 will be reflected to the eyes of the observer inclosed by the eye-piece 7.

The lens 9 is such that when an observer with his eyes inclosed by the eye-piece 7 directs the lens at the face of a person the image of the face seen through the transparent disk 4 is reduced to approximately the size of tooth outlines spaced about the outer portion of the disk 4.

It has been well established in the dental profession that in many cases the shape of the upper central incisors corresponds to the shape of the face of a patient. When this relationship exists, a much more harmonious appearance is presented than would otherwise be the case. There are many cases, however, in which the shape of the natural teeth do not harmonize with the shape of the face of the individual, and in such cases when the patient is to be provided with artificial teeth, the use of my invention renders it possible to supply him with artificial teeth having the particular shape which will give the most harmonious and pleasing appearance.

All the faces may be classed in one of three types, or a combination of these types, namely, square, tapering and oval.

Artificial teeth are accordingly made of types, square, oval or tapering, and various combinations of these shapes.

The disk 4 has representations of a large number of various modifications of these three types of teeth so that when the operator focuses the lens 9 on the face of his patient and superimposes various teeth representations on the disk over the image thereon, reflected by the mirror, he will be able to find one of these representations that will closely conform to the contour of the patient's face.

A tooth of this particular contour will then be prepared and the patient will have replaced in his mouth a form of tooth properly conforming to the outline of the face.

While I have described my invention and illustrated it in a particular embodiment, I do not wish it understood that I limit myself to this construction, as it is evident that the application of the invention may be varied in many ways within the scope of the following claims.

Claims:

1. A tooth form finder comprising a member provided with a multiplicity of independent and different outlines of various tooth forms, means associated with said member for producing a reduced outline image of a patient's face and reflecting it upon the member, and means for moving the first-named means and member relatively to bring any of said tooth form outlines and said facial outline into superposed position.

2. A tooth form finder comprising a member provided with a multiplicity of independent and different outlines of various tooth forms each of the natural size of the tooth represented, means associated with said member for producing an image of the facial outline of the patient of a reduced size substantially that of the tooth form outline and for reflecting said image upon the member, and means for moving the first-named means and member relatively to bring any of said tooth form outlines and said facial outline into superposed position.

3. A tooth form finder comprising a member carrying outlines of various tooth forms, a reducing lens for obtaining an image of the reduced facial outline of a patient, means for reflecting said image upon said member, and means whereby said member may be moved to bring any one of said tooth outlines into superposed position relatively to said facial outline image.

4. A tooth form finder comprising a rotatable disk carrying outlines of various tooth forms, a reducing lens for obtaining an image of the reduced facial outline of a patient, a mirror positioned to reflect said image upon said member, means whereby said member may be rotated to bring any one of said tooth outlines into superposed position relatively to said facial outline image, and an eye piece positioned above said mirror.

5. In a tooth form finder, a combination of a housing, a transparent disk rotatably mounted therein, a lens box carried by said housing and having a lens therein, said disk being adapted to be rotated over an opening of said housing, a mirror in said housing adapted to reflect light from said lens on to that portion of said disk positioned above said lens holder and an eye-piece positioned above said mirror.

6. In a tooth form finder, a combination of a housing, a transparent disk rotatably mounted therein, a lens box carried by said housing and having a lens therein, said disk being adapted to be rotated over an opening of said housing, a mirror in said housing adapted to reflect light from said lens on to that portion of said disk positioned above said lens holder and an eye-piece positioned above said lens holder, said disk having representations of various tooth forms thereon.

FRANK M. WADSWORTH.